United States Patent
Briggs et al.

(10) Patent No.: US 10,423,704 B2
(45) Date of Patent: Sep. 24, 2019

(54) UTILIZING HYPERLINK FORWARD CHAIN ANALYSIS TO SIGNIFY RELEVANT LINKS TO A USER

(71) Applicant: International Business Machines Corporation, Armonk, NY (US)

(72) Inventors: Simon A. S. Briggs, Winchester (GB); James K. Hook, Bristol (GB); Hamish C. Hunt, Ashford (GB); Nicholas K. Lincoln, Stockbridge (GB)

(73) Assignee: International Business Machines Corporation, Armonk, NY (US)

(*) Notice: Subject to any disclaimer, the term of this patent is extended or adjusted under 35 U.S.C. 154(b) by 354 days.

(21) Appl. No.: 14/573,042

(22) Filed: Dec. 17, 2014

(65) Prior Publication Data

US 2016/0179861 A1 Jun. 23, 2016

(51) Int. Cl.
| | | |
|---|---|---|
| *G06F 17/30* | (2006.01) | |
| *G06F 17/22* | (2006.01) | |
| *G06F 16/2457* | (2019.01) | |
| *H04L 29/08* | (2006.01) | |
| *G06F 16/955* | (2019.01) | |
| *G06F 17/24* | (2006.01) | |

(52) U.S. Cl.
CPC .... *G06F 17/2235* (2013.01); *G06F 16/24578* (2019.01); *G06F 16/9558* (2019.01); *G06F 16/9566* (2019.01); *H04L 67/02* (2013.01); *G06F 17/241* (2013.01)

(58) Field of Classification Search
CPC ............. G06F 17/2235; G06F 15/0258; G06F 16/951; Y10S 707/99937
See application file for complete search history.

(56) References Cited

U.S. PATENT DOCUMENTS

| | | | |
|---|---|---|---|
| 8,161,050 B2 | 4/2012 | Venolia | |
| 9,489,352 B1 * | 11/2016 | Agostino | G06F 17/2235 |
| 2005/0240576 A1 * | 10/2005 | Piscitello | G06F 17/30657 |
| 2007/0106659 A1 * | 5/2007 | Lu | G06F 17/30554 |

(Continued)

OTHER PUBLICATIONS

U.S. Appl. No. 14/870,102, Entitled "Utilizing Hyperlink Forward Chain Analysis to Signify Relevant Links to a User", filed Sep. 3, 2015.

(Continued)

*Primary Examiner* — Usmaan Saeed
*Assistant Examiner* — William P Bartlett
(74) *Attorney, Agent, or Firm* — William H. Hartwell

(57) ABSTRACT

Software that performs the following steps: (i) receiving a first set of search term(s); (ii) receiving identifying information identifying a set of primary web page(s), where each primary web page has been determined, by a search engine, to be potentially relevant to the first set of search term(s); (iii) receiving first visited page information, where the first visited page information includes identifying information identifying: a first visited primary web page that has been visited by a user, and a first set of secondary web page(s) corresponding to the first visited primary web page, where each secondary web page is linked by the first visited primary web page; and (iv) determining relevance score(s) for each secondary web page, where each relevance score indicates an amount of relevance for its respective secondary web page with respect to the first set of search terms.

18 Claims, 4 Drawing Sheets

(56) References Cited

U.S. PATENT DOCUMENTS

| | | | | |
|---|---|---|---|---|
| 2008/0133460 A1* | 6/2008 | Clark | ................ | G06F 17/30864 |
| 2008/0201317 A1* | 8/2008 | Sue | ................... | G06F 17/30864 |
| 2008/0256046 A1 | 10/2008 | Blackman et al. | | |
| 2008/0319980 A1* | 12/2008 | Pickens | ............. | G06F 17/30728 |
| 2009/0006371 A1* | 1/2009 | Denoue | ............. | G06F 17/30867 |
| 2010/0106703 A1* | 4/2010 | Cramer | ............. | G06F 17/30867 |
| | | | | 707/706 |
| 2011/0087659 A1* | 4/2011 | Dey | ................. | G06F 17/30696 |
| | | | | 707/728 |
| 2012/0158685 A1 | 6/2012 | White et al. | | |
| 2012/0173520 A1 | 7/2012 | Wu et al. | | |
| 2012/0254776 A1 | 10/2012 | Corella et al. | | |
| 2013/0204871 A1* | 8/2013 | Wong | ..................... | G06Q 50/01 |
| | | | | 707/732 |
| 2014/0201198 A1 | 7/2014 | Chen et al. | | |
| 2015/0193390 A1* | 7/2015 | Stekkelpak | ....... | G06F 17/30882 |
| | | | | 715/207 |
| 2016/0179957 A1 | 6/2016 | Briggs et al. | | |

OTHER PUBLICATIONS

Appendix P.: List of IBM Patents or Patent Applications Treated As Related, Dated Oct. 1, 2015, 2 pages.

Shankland S. "Chrome could preload pages for 'wicked-fast' Web", Nov. 9, 2010, <http://www.cnet.com/uk/news/chrome-could-preload-pages-for-wicked-fast-web/#!>.

Zaragoza H. et al. "Web Search Relevance Ranking", Encyclopedia of Database Systems, Springer Verlag, 2009, pp. 3497-3501, Microsoft Research, < http://dx.doi.org/10.1007/978-0-387-39940-9_463>.

"Highlighting missing information or non-ideal web experiences via hyperlink chain analysis", An IP.com Prior Art Database Technical Disclosure, IP.com No. 000236210, IP.com Electronic Publication: Apr. 11, 2014.

\* cited by examiner

400a

400b

UTILIZING HYPERLINK FORWARD CHAIN ANALYSIS TO SIGNIFY RELEVANT LINKS TO A USER

BACKGROUND OF THE INVENTION

The present invention relates generally to the field of web searching, and more particularly to the utilization of search engine results.

Web search engines ("search engines") are known. Search engines are software systems designed to search for information on the World Wide Web. Search engines produce results in response to search engine queries, which typically include keywords (also referred to as "search terms"). Search engine results typically include a mix of web pages (also referred to as "pages"), images, and other types of files.

Search engine results are commonly provided to search engine users in the form of hyperlinks. A hyperlink (also referred to as a "link") is a reference to data (typically, a web page) that a user can directly follow by clicking, hovering over, or otherwise selecting. Hyperlinks typically include hypertext, which is the text that a user of a web browser sees when a hyperlink is displayed.

When a user of a web browser (also referred to as a "browser") selects a hyperlink, the browser sends a request to the server holding the destination webpage. The request includes a referrer field, which indicates the last page that the user was on (that is, the page where the user clicked the link). The referrer field can also include additional information about the referring web page. Specifically, when the referring web page is a search engine, the referrer field can sometimes include the user's search engine query.

SUMMARY

According to an aspect of the present invention, there is a method, computer program product and/or system that performs the following steps (not necessarily in the following order): (i) receiving a first set of search term(s); (ii) receiving identifying information identifying a set of primary web page(s), where each primary web page of the set of primary web page(s) has been determined, by a search engine, to be potentially relevant to the first set of search term(s); (iii) receiving first visited page information, where the first visited page information includes identifying information identifying: a first visited primary web page that has been visited by a user, and a first set of secondary web page(s) corresponding to the first visited primary web page, where each secondary web page of the set of secondary web page(s) is linked by the first visited primary web page; (iv) determining relevance score(s) for each secondary web page of the first set of secondary web page(s), where each relevance score indicates an amount of relevance for its respective secondary web page with respect to the first set of search terms; and (v) presenting, to the user, an indication of the relevance score(s) for at least one of the secondary web page(s) of the first set of secondary web page(s).

DETAILED DESCRIPTION

Figure 1:
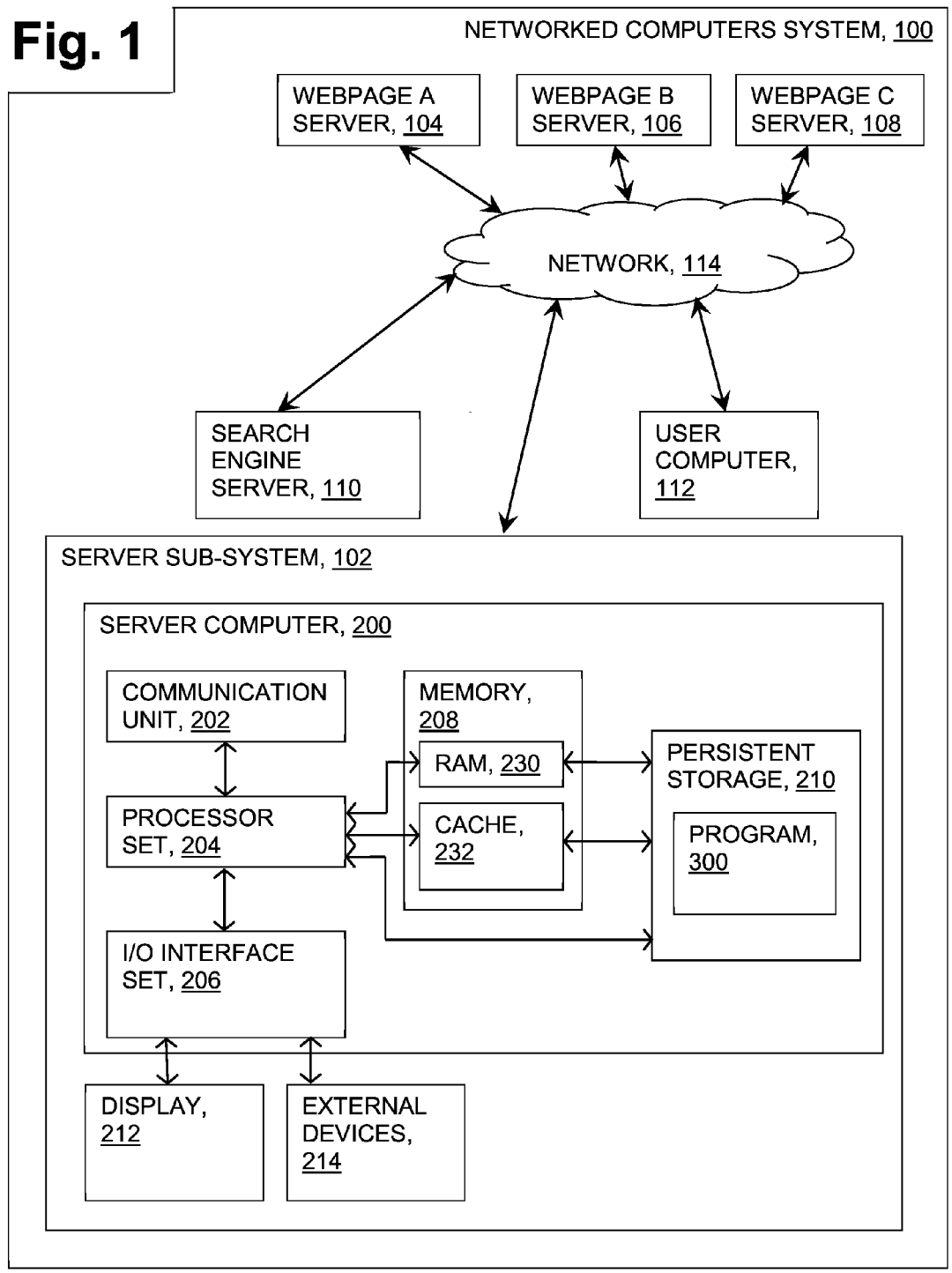
FIG. 1 is a block diagram view of a first embodiment of a system according to the present invention.

When performing web searches using web-based search engines, users are typically presented with lists of web pages that match their search terms. Once a user navigates to one of those web pages (referred to as the "primary web page"), he or she may find links to additional web pages (referred to as "secondary web pages") that may or may not be related to the user's original search. Embodiments of the present invention determine the relevance of secondary web pages to a user's original search terms and correspondingly communicate that relevance to the user, thereby assisting the user in his or her selection of additional web pages to visit. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; Webpage A server 104; Webpage B server 106; Webpage C server 108; search engine server 110; user computer 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

Figure 2:
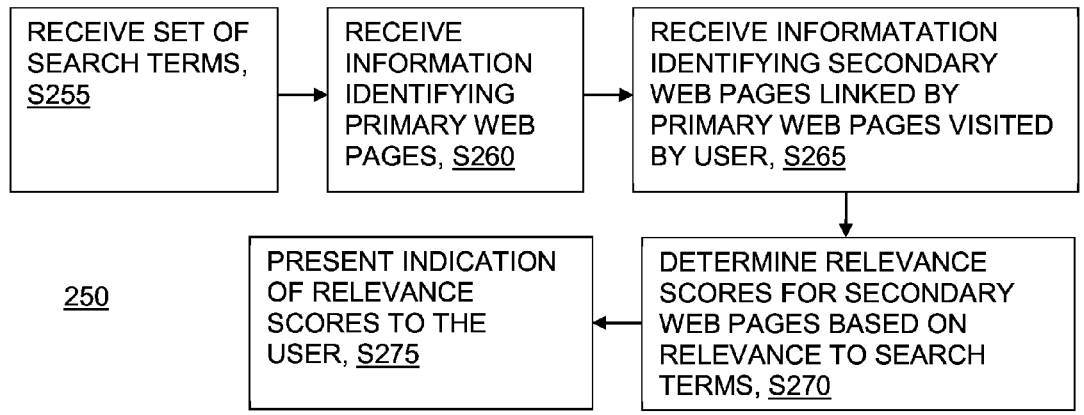
FIG. 2 is a flowchart showing a first embodiment method performed, at least in part, by the first embodiment system.
Figure 3:
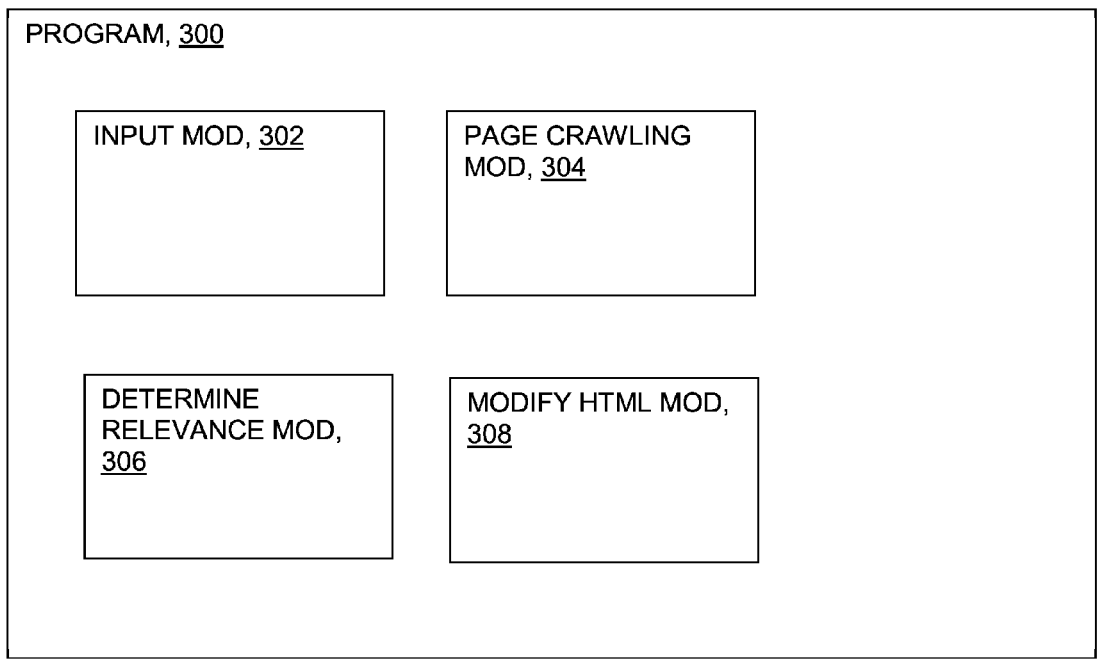
FIG. 3 is a block diagram showing a machine logic (for example, software) portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

The following paragraphs include a discussion of an example embodiment according to the present invention (referred to as the "present embodiment" or the "present example embodiment"). In the present example embodiment, a user is researching a topic on the World Wide Web using user computer 112 (see FIG. 1). As the user performs his/her research, server computer 200 performs the steps of the method shown in flowchart 250. The following paragraphs discuss the user's actions on user computer 112 and the corresponding method steps performed by server computer 200.

Processing begins at step S255, where input module ("mod") 302 receives a set of search terms. Generally speaking, the set of search terms includes terms (also referred to as "keywords") entered into a search engine by the user in order to begin his/her research. As used herein, the search terms may include any combinations of letters, words, numbers, and/or special characters that can be used for searching in a search engine. The set of search terms may be received from a wide variety of places. For example, in some embodiments, the set of search terms is received from data stored in the user's web browser. Or, in some embodiments, the set of search terms is received from an HTTP referrer field in an HTTP header.

Figure 4A:
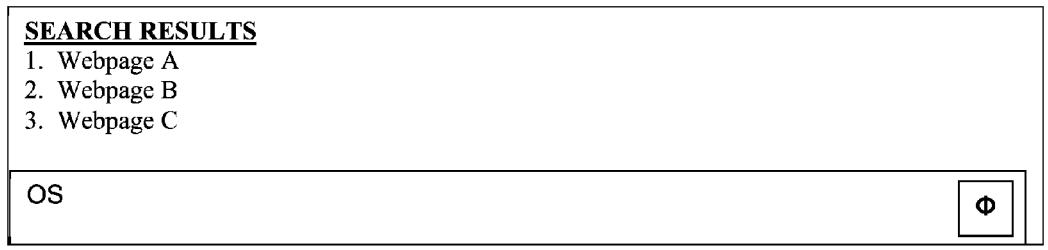
FIG. 4A is a screenshot view that is helpful in understanding the first embodiment system.

Processing proceeds to step S260, where input mod 302 receives identifying information identifying a set of primary web pages, where each primary web page in the set has been determined, by the search engine, to be potentially relevant to the first set of search terms. Or, stated another way, in step S260, input mod 302 receives a list of search results produced by the search engine (using search engine server 110) in response to the set of search terms. On the user's side, the user has entered the search terms into the search engine, and the search engine has produced a list of primary pages as a result. Each primary web page is a page that the user may wish to visit in performing his/her search. In the present example embodiment, there are three primary web pages: (i) Webpage A (hosted by Webpage A server 104); (ii) Webpage B (hosted by Webpage B server 106); and (iii) Webpage C (hosted by Webpage C server 108). An example screenshot 400a showing the list of primary web pages produced by search engine server 110 is shown in FIG. 4A (where screenshot 400a is a simplified example of a view that the user would see on user computer 112).

Once the user has a list of search results (that is, a set of primary web pages), the user selects (and visits) one of the results (a primary page) to determine whether it contains any information helpful to the user's research. As such, processing for the present method proceeds to step S265, where input mod 302 receives information identifying secondary web pages linked by primary web pages visited by the user. Or, stated another way, when the user visits a primary web page, the primary web page will include links to secondary pages that may also contain information helpful to the user's research; in this step, information about the secondary pages is sent to program 300. More specifically, in this step, input mod 302 (of program 300) receives information identifying: (i) the visited primary web page (that has been visited by the user), and (ii) a set of secondary web pages corresponding to the visited primary web page, where each secondary web page of the set of secondary web pages is linked by the visited primary web page. In the present example embodiment, the user selects Webpage A, which links to three secondary web pages: (i) Webpage D; (ii) Webpage E; and (iii) Webpage F. As such, program 300 receives information identifying Webpage A along with the secondary pages of Webpage D, Webpage E, and Webpage F. Alternatively, in other embodiments of the present invention, program 300 only receives information identifying the visited primary web page. In these embodiments, program 300 subsequently uses page crawling mod 304 (see FIG. 3) to search the visited primary web page for links to secondary web pages.

Processing proceeds to step S270, where determine relevance mod 306 determines relevance scores for each secondary web page, where each relevance score indicates an amount of relevance for its respective secondary web page with respect to the set of search terms. In this step, program 300 determines whether the secondary web pages are relevant to the user. In some embodiments, program 300 does this by actually visiting the secondary web pages and searching them for the set of search terms using page crawling mod 304. In other embodiments, the determination is performed by utilizing known meta-data about the secondary web pages, or by some other means. Some examples of the types of information that can be used to determine a secondary web page's relevance score include, but are not limited to: (i) unstructured data from the secondary web page itself (such as the secondary web page's HTML source code); (ii) structured data provided by the secondary web page's respective web server (such as an XML-formatted document); and/or (iii) structured/unstructured data located elsewhere (such as, for example, a list of "helpful web pages" located on another web page, where the secondary web page is included in the list). These examples are not meant to be limiting, and relevance scores may be determined using any available data relating to their respective web pages.

Similarly, the relevance scores themselves may be generated in a wide variety of ways and may include a wide variety of known scoring systems. For example, in some embodiments, relevance scores may be based on one or more of the following: (i) the similarity between the secondary web page's on-page text (retrieved using page crawling mod 304) and the search terms; (ii) whether the secondary web page was authored by a known expert associated with the search terms; (iii) whether the secondary web page is located at a web domain that is known for content relating to the search terms; and/or (iv) whether the secondary web page contains content that has been "confirmed" as being accurate and/or relevant (for example, when the secondary web page is a forum posting in a question/answer format, and the poster has indicated that an answer to his/her question was particularly helpful or relevant). Additionally, relevance scores may be represented numerically, alphabetically, or via any other known (or yet to be known) method. In the present example embodiment, relevance scores are represented as percentages relating to how closely the secondary web pages match the search terms. In the present example: (i) Webpage D has a relevance score of 97%; (ii) Webpage E has a relevance score of 92%; and (iii) Webpage F has a relevance score of 50%.

Processing proceeds to step S275, where modify HTML mod 308 presents, to the user, an indication of the relevance scores for at least one of the secondary web pages. In the present example embodiment, the presentation includes modifying the HTML of certain web pages displaying on user computer 112 to visually indicate the relevance scores of the different secondary web pages. However, in other embodiments, the indication may take other forms. For example, in some embodiments, the indication may be communicated to the user in the form of a message, such as a text (SMS) message, an e-mail message, an instant message (sent using an instant messaging client), or a pop-up window on the user's screen on user computer 112. In other embodiments, the indication may include automatically redirecting the user's web browser to one of the secondary web pages (such as the secondary web page with the highest relevance score). In still other embodiments (such as when the user is using a library computer to perform the research), the indication may include informing a third party (such as a research assistant) of the most relevant web pages so that the third party can assist the user in performing his/her research. For additional examples of ways to present an indication of relevance scores (such as, for example, by modifying hyperlinks), see the Further Comments and/or Embodiments sub-section of this Detailed Description.

Figure 4B:
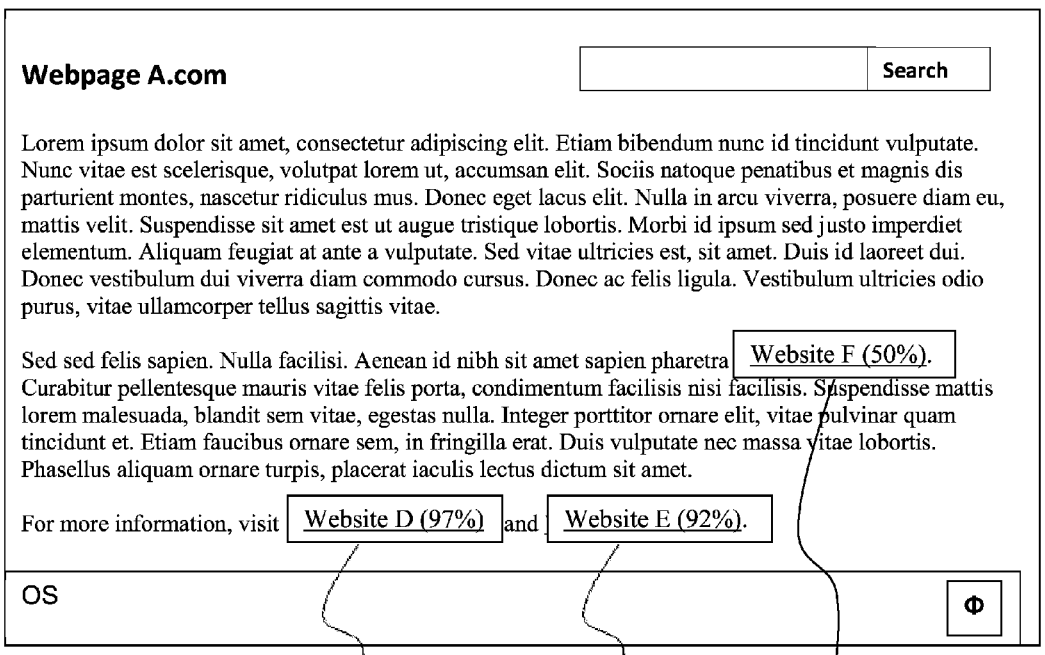
FIG. 4B is a screenshot view generated by the first embodiment system.
Figure 4C:
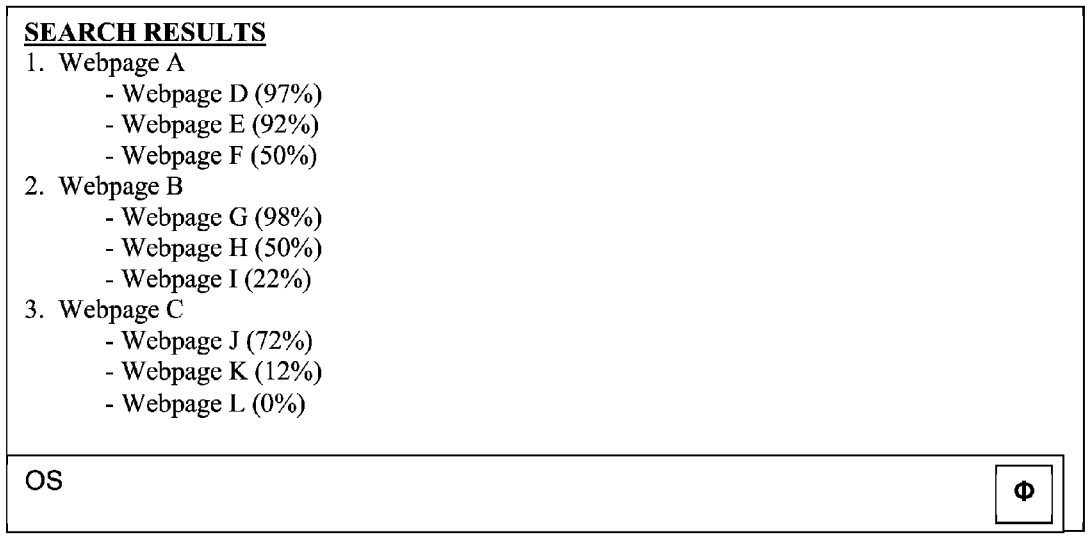
FIG. 4C is a screenshot view generated by the first embodiment system.

As mentioned above, in the present example embodiment, program 300 modifies the HTML of certain web pages in order to present an indication of the relevance scores to the user. Screenshots 400b (see FIG. 4B), and 400c (see FIG. 4C) are examples according to the present example embodiment that demonstrate this modification. Screenshot 400b shows the primary web page Webpage A as viewed on user computer 112. In this example, program 300 annotates the hypertext associated with each respective secondary page with its corresponding relevance score. Specifically: (i) the hypertext associated with Website D 402 is annotated with Website D's relevance score of 97%; (ii) the hypertext associated with Website E 404 is annotated with Website E's relevance score of 92%; and (iii) the hypertext associated with Website F 406 is annotated with Website F's relevance score of 50%. Screenshot 400c shows a similar type of annotation, but in screenshot 400c, the annotation takes place on the original search results page (a previous version of which is shown in FIG. 4A). Screenshot 400c (which is viewed on user computer 112) shows the original search results (received from search engine server 110) annotated (by program 300 on computer 200) with lists of each primary web page's corresponding secondary web pages along with their corresponding relevance scores. In this example, program 300 is able to provide the user with a consolidated listing of relevant pages in order to better assist the user with his/her research.

In some embodiments of the present invention, the method represented by flowchart 250 may be executed iteratively over multiple sets of secondary web pages. For example, in one embodiment, program 300: (i) determines that the user has visited a secondary web page; (ii) receives a set of tertiary web pages linked to by the secondary web page; (iii) determines relevance scores for each tertiary link; and (iv) presents an indication of the relevance scores to the user. In this embodiment, program 300 may continue this process for as many iterations as the user chooses (for example, for quaternary web pages, quinary web pages, etc.).

III. Further Comments and/or Embodiments

Some embodiments of the present invention recognize the following facts, potential problems and/or potential areas for improvement with respect to the current state of the art: (i) search engine users can only determine that secondary links (that is, links located on pages listed in search results) are valid by examining the secondary links in context; and/or (ii) existing methods focus on providing annotations and/or rankings on initial search result pages.

Some embodiments of the present invention may include one, or more, of the following features, characteristics and/or advantages: (i) informing search engine users as to which secondary links are relevant to their original search query; (ii) carrying search results forward onto subsequent pages to provide additional information; and/or (iii) providing an increased user experience for users of search engines and/or web browsers.

In many embodiments of the present invention, a user visits a destination web page (also referred to as the "primary web page") as a result of selecting a link provided by a search engine. In these embodiments, search terms that the user originally provided to the search engine can be subsequently provided (or "carried through") to the server that hosts the destination web page. The server can then inspect each link contained within the destination web page for relevance to the search terms, and visually modify the links according to their respective relevance to the search terms. Alternatively, the same inspection and modification of links can be performed by the user's web browser.

Figure 5:
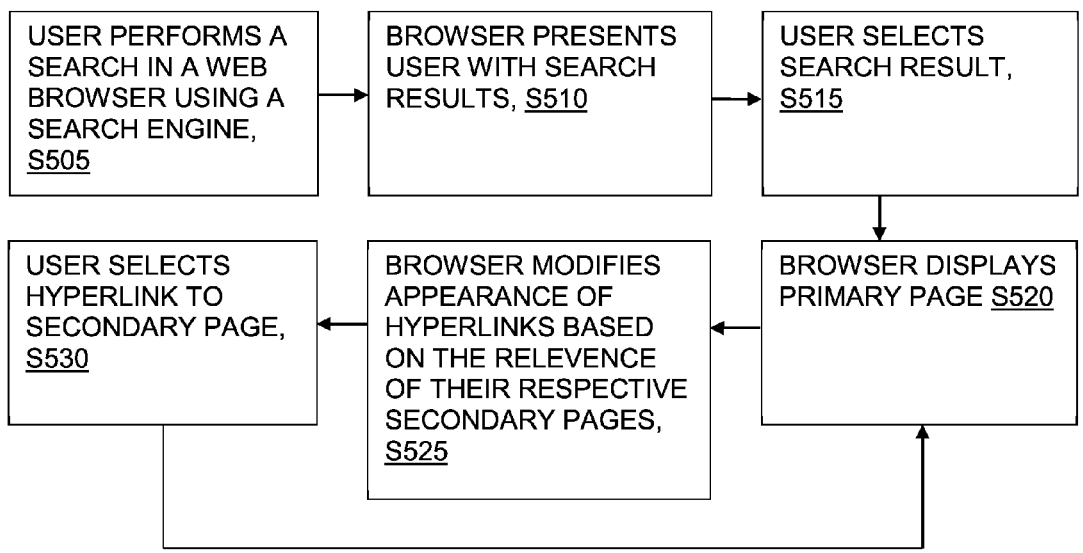
FIG. 5 is a flowchart showing a second embodiment method performed, at least in part, by a second embodiment system.

Flowchart 500 (see FIG. 5) shows a method according to the present invention. Processing begins at step S505, where a user performs a search in a web browser using a search engine, using search terms to define the parameters of the search. In some embodiments, for example, the search engine is included in the functionality of the web browser. In other embodiments, the search engine is located at a web page that is visited by the browser.

Processing proceeds to step S510, where the browser presents the user with search results (also referred to as a "set of primary web pages") from the search engine on a search results web page. Furthermore, in this step, the search terms used in the previous step are stored as metadata against each of the search results.

Processing proceeds to step S515, where the user selects one of the search results. In many embodiments, the selection occurs when the user "clicks" a hyperlink associated with the search result. At this point, in some embodiments, the search terms associated with the selected search result are "passed forward" (or "carried through") as part of the hyperlink. For example, in some embodiments, the search terms will actually be appended to the hyperlink itself. In other embodiments, the search terms will be stored by the browser for later use.

Processing proceeds to step S520, where, as a result of the user selecting the search result, the browser displays a webpage associated with the search result (referred to as the "primary page"). In displaying the primary page, the browser displays hyperlinks that are included on the primary page, where the hyperlinks are adapted to direct the user to additional webpages (referred to as "secondary pages"). The search terms that have been passed forward from the search results are then stored as meta-data against each of the hyperlinks on the primary page.

Processing proceeds to step S525, where the browser modifies the appearance of the hyperlinks based on the relevance of their respective secondary pages. In this step, the browser: (i) follows each hyperlink to available secondary pages; (ii) searches each of the secondary pages using the previously passed-forward search terms; (iii) determines the relevance of each secondary page based on the search; and (iv) modifies the appearance of the hyperlinks on the primary page based on their respective relevance. In many embodiments, items (i), (ii), and (iii) are performed by the browser without displaying anything to the user (that is, the browser does not display each secondary page as it is searching it).

The browser can modify the appearance of the hyperlinks in a variety of ways. For example, in one embodiment, the browser modifies the color of the respective hyperlinks' hypertext. In this embodiment, the color indicates the relevance of the link to the user while only minimally modifying the rendering of the primary page. In another embodiment, the browser annotates hypertext based on the relevance of its associated hyperlink. In one example, the browser annotates the hypertext with an emoticon (such as a "smiley face" or a "frowny face") in order to indicate relevance. In another example, the browser adds a small numeric rating to the hypertext of each hyperlink. This example has the additional benefit of being able to be recognized by a screen reader used by a visually impaired user. However, this is not meant to be limiting, and embodiments of the present invention can modify the appearance of hyperlinks in a wide variety of ways.

Processing proceeds to step S530, where the user selects a hyperlink to a secondary page. In return, the browser displays the secondary page, and processing returns to step S520. Once at step S520, the browser treats the current "secondary" page as the new "primary" page, and processing continues for as long as the user continues to select new hyperlinks.

In some embodiments of the present invention, the user is given additional control over the display of modified hyperlinks. In one embodiment, for example, the browser provides the user with the ability to add and/or remove search terms from the search terms being passed forward. In another embodiment, the browser provides the user with the ability to choose between having color-modified hyperlinks and/or annotated hyperlinks. However, these examples are not meant to be limiting, and embodiments of the present invention may provide the user with a wide variety of customization options to assist the user in selecting relevant hyperlinks.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user; and/or (iii) a group of related users.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer program product comprising a computer readable storage medium having stored thereon:
   program instructions programmed to receive a first set of search term(s);
   program instructions programmed to receive identifying information identifying a set of primary web page(s), where each primary web page of the set of primary web page(s) has been determined, by a search engine, to be relevant to the first set of search term(s), and where each primary web page of the set of primary web page(s) is linked to by a first search result web page generated by the search engine; and
   program instructions programmed to, in response to a user visiting a first visited primary web page of the set of primary web page(s) by selecting a first hyperlink:
      append the first set of search term(s) to the first hyperlink, wherein the first set of search term(s) are passed forward to the first visited primary web page as part of the first hyperlink,
      receive first visited page information, where the first visited page information includes identifying information identifying: (i) the first hyperlink of the first visited primary web page that has been visited by the user, and (ii) a first set of unvisited secondary web page(s) corresponding to the first visited primary web page, where each unvisited secondary web page of the set of unvisited secondary web page(s) is linked to by the first visited primary web page via a respective existing hyperlink to the respective unvisited secondary web page on the first visited primary web page, where each respective existing hyperlink to each respective unvisited secondary web page exists on the first visited primary web page at a time that the first visited primary web page is visited by the user and corresponds to respective existing hypertext that exists on the first visited primary web page at the time that the first visited primary web page is visited by the user, and where each unvisited secondary web page of the set of unvisited secondary web page(s) is unvisited by the user, determine relevance score(s) for each unvisited secondary web page of the first set of unvisited secondary web page(s), where each relevance score: (i) indicates an amount of relevance for a respective unvisited secondary web page with respect to the first set of search term(s), and (ii) is determined by visiting the respective unvisited second web page and searching the respective unvisited secondary web page for at least one search term of the first set of search term(s), and
      present, to the user, an indication of the relevance score(s) for at least one of the unvisited secondary web page(s) of the first set of unvisited secondary web page(s), wherein presenting the indication of the relevance score(s) for at least one of the unvisited secondary web page(s) of the first set of unvisited secondary web page(s) includes annotating, on the first primary visited web page, for each indicated unvisited secondary web page, the respective existing hypertext corresponding to the respective existing hyperlink to the respective unvisited secondary web page to include information related to the respective relevance score for the respective unvisited secondary web page.

2. The computer program product of claim 1, wherein: the set of search term(s) is received from data stored in the user's web browser.

3. The computer program product of claim 1, wherein: the set of search term(s) is received from an HTTP referrer field in an HTTP header.

4. The computer program product of claim 1, wherein the computer readable storage medium has further stored thereon:
   program instructions programmed to determine that the user has visited a first secondary web page of the first set of unvisited secondary web page(s);
   program instructions programmed to receive a first set of unvisited tertiary web page(s) corresponding to the first secondary web page, where each unvisited tertiary web page of the first set of unvisited tertiary web page(s) is linked to by the first secondary web page, and where each unvisited tertiary web page of the set of unvisited tertiary web page(s) is unvisited by the user;
   program instructions programmed to determine tertiary relevance score(s) for each unvisited tertiary web page of the first set of unvisited tertiary web page(s), where each tertiary relevance score indicates an amount of relevance for its respective unvisited tertiary web page with respect to the first set of search term(s); and
   program instructions programmed to present, to the user, an indication of the tertiary relevance score(s) for at least one of the unvisited tertiary web page(s) of the first set of unvisited tertiary web page(s).

5. A computer system comprising:
a processor(s) set; and
a computer readable storage medium;
wherein:
the processor set is structured, located, connected and/or programmed to run program instructions stored on the computer readable storage medium; and
the stored program instructions include:
  program instructions programmed to receive a first set of search term(s);
  program instructions programmed to receive identifying information identifying a set of primary web page(s), where each primary web page of the set of primary web page(s) has been determined, by a search engine, to be relevant to the first set of search term(s), and where each primary web page of the set of primary web page(s) is linked to by a first search result web page generated by the search engine; and
  program instructions programmed to, in response to a user visiting a first visited primary web page of the set of primary web page(s) by selecting a first hyperlink:
    append the first set of search term(s) to the first hyperlink, wherein the first set of search term(s) are passed forward to the first visited primary web page as part of the first hyperlink, receive first visited page information, where the first visited page information includes identifying information identifying: (i) the first hyperlink of the first visited primary web page that has been visited by the user, and (ii) a first set of unvisited secondary web page(s) corresponding to the first visited primary web page, where each unvisited secondary web page of the set of unvisited secondary web page(s) is linked to by the first visited primary web page via a respective existing hyperlink to the respective unvisited secondary web page on the first visited primary web page, where each respective existing hyperlink to each respective unvisited secondary web page exists on the first visited primary web page at a time that the first visited primary web page is visited by the user and corresponds to respective existing hypertext that exists on the first visited primary web page at the time that the first visited primary web page is visited by the user, and where each unvisited secondary web page of the set of unvisited secondary web page(s) is unvisited by the user,
    determine relevance score(s) for each unvisited secondary web page of the first set of unvisited secondary web page(s), where each relevance score: (i) indicates an amount of relevance for a respective unvisited secondary web page with respect to the first set of search term(s), and (ii) is determined by visiting the respective unvisited second web page and searching the respective unvisited secondary web page for at least one search term of the first set of search term(s), and
    present, to the user, an indication of the relevance score(s) for at least one of the unvisited secondary web page(s) of the first set of unvisited secondary web page(s), wherein presenting the indication of the relevance score(s) for at least one of the unvisited secondary web page(s) of the first set of unvisited secondary web page(s) includes annotating, on the first primary visited web page, for each indicated unvisited secondary web page, the respective existing hypertext corresponding to the respective existing hyperlink to the respective unvisited secondary web page to include information related to the respective relevance score for the respective unvisited secondary web page.

6. The computer system of claim 5, wherein:
the set of search term(s) is received from data stored in the user's web browser.

7. The computer system of claim 5, wherein:
the set of search term(s) is received from an HTTP referrer field in an HTTP header.

8. The computer system of claim 5, wherein the stored program instructions further include:
  program instructions programmed to determine that the user has visited a first secondary web page of the first set of unvisited secondary web page(s);
  program instructions programmed to receive a first set of unvisited tertiary web page(s) corresponding to the first secondary web page, where each unvisited tertiary web page of the first set of unvisited tertiary web page(s) is linked to by the first secondary web page, and where each unvisited tertiary web page of the set of unvisited tertiary web page(s) is unvisited by the user;
  program instructions programmed to determine tertiary relevance score(s) for each unvisited tertiary web page of the first set of unvisited tertiary web page(s), where each tertiary relevance score indicates an amount of relevance for its respective unvisited tertiary web page with respect to the first set of search term(s); and
  program instructions programmed to present, to the user, an indication of the tertiary relevance score(s) for at least one of the unvisited tertiary web page(s) of the first set of unvisited tertiary web page(s).

9. The computer program product of claim 1, wherein the first set of unvisited secondary web page(s) includes a plurality of unvisited secondary web pages, and wherein the computer readable storage medium has further stored thereon:
  program instructions programmed to present, to the user, an indication of the relevance score for at least one additional unvisited secondary web page of the first set of unvisited secondary web page(s), wherein presenting the indication of the relevance score for the at least one additional unvisited secondary web page of the first set of unvisited secondary web page(s) includes automatically redirecting a web browser of the user to the respective additional unvisited secondary web page of the first set of unvisited secondary web page(s).

10. The computer program product of claim 1, wherein the relevance score(s) for each unvisited secondary web page of the first set of unvisited secondary web page(s) are determined based, at least in part, on: (i) an amount of similarity between on-page text of the respective unvisited secondary web page(s) and the search terms; (ii) whether the respective unvisited secondary web page(s) were authored by known experts associated with the search terms; (iii) whether the respective unvisited secondary web page(s) are located at web domains that are known for content relating to the search terms; and (iv) whether the respective unvisited secondary web page(s) contain content confirmed as being accurate.

11. The computer system of claim 5, wherein the first set of unvisited secondary web page(s) includes a plurality of unvisited secondary web pages, and wherein the stored program instructions further include:
  program instructions programmed to present, to the user, an indication of the relevance score for at least one additional unvisited secondary web page of the first set of unvisited secondary web page(s), wherein presenting the indication of the relevance score for the at least one additional unvisited secondary web page of the first set of unvisited secondary web page(s) includes automatically redirecting a web browser of the user to the respective additional unvisited secondary web page of the first set of unvisited secondary web page(s).

12. The computer system of claim 5, wherein the relevance score(s) for each unvisited secondary web page of the first set of unvisited secondary web page(s) are determined based, at least in part, on: (i) an amount of similarity between on-page text of the respective unvisited secondary web page(s) and the search terms; (ii) whether the respective unvisited secondary web page(s) were authored by known experts associated with the search terms; (iii) whether the respective unvisited secondary web page(s) are located at web domains that are known for content relating to the search terms; and (iv) whether the respective unvisited secondary web page(s) contain content confirmed as being accurate.

13. A computer-implemented method comprising: receiving a first set of search term(s);
receiving identifying information identifying a set of primary web page(s), where each primary web page of the set of primary web page(s) has been determined, by a search engine, to be relevant to the first set of search term(s), and where each primary web page of the set of primary web page(s) is linked to by a first search result web page generated by the search engine; and
in response to a user visiting a first visited primary web page of the set of primary web page(s) by selecting a first hyperlink:
appending the first set of search term(s) to the first hyperlink, wherein the first set of search term(s) are passed forward to the first visited primary web page as part of the first hyperlink,
receiving first visited page information, where the first visited page information includes identifying information identifying: (i) the first hyperlink of the first visited primary web page that has been visited by the user, and (ii) a first set of unvisited secondary web page(s) corresponding to the first visited primary web page, where each unvisited secondary web page of the set of unvisited secondary web page(s) is linked to by the first visited primary web page via a respective existing hyperlink to the respective unvisited secondary web page on the first visited primary web page, where each respective existing hyperlink to each respective unvisited secondary web page exists on the first visited primary web page at a time that the first visited primary web page is visited by the user and corresponds to respective existing hypertext that exists on the first visited primary web page at the time that the first visited primary web page is visited by the user, and where each unvisited secondary web page of the set of unvisited secondary web page(s) is unvisited by the user,
determining relevance score(s) for each unvisited secondary web page of the first set of unvisited secondary web page(s), where each relevance score: (i) indicates an amount of relevance for a respective unvisited secondary web page with respect to the first set of search term(s), and (ii) is determined by visiting the respective unvisited second web page and searching the respective unvisited secondary web page for at least one search term of the first set of search term(s), and
presenting, to the user, an indication of the relevance score(s) for at least one of the unvisited secondary web page(s) of the first set of unvisited secondary web page(s), wherein presenting the indication of the relevance score(s) for at least one of the unvisited secondary web page(s) of the first set of unvisited secondary web page(s) includes annotating, on the first primary visited web page, for each indicated unvisited secondary web page, the respective existing hypertext corresponding to the respective existing hyperlink to the respective unvisited secondary web page to include information related to the respective relevance score for the respective unvisited secondary web page.

14. The computer-implemented method of claim 13, wherein: the set of search term(s) is received from data stored in the user's web browser.

15. The computer-implemented method of claim 13, wherein: the set of search term(s) is received from an HTTP referrer field in an HTTP header.

16. The computer-implemented method of claim 13, further comprising:
determining that the user has visited a first secondary web page of the first set of unvisited secondary web page(s);
receiving a first set of unvisited tertiary web page(s) corresponding to the first secondary web page, where each unvisited tertiary web page of the first set of unvisited tertiary web page(s) is linked to by the first secondary web page, and where each unvisited tertiary web page of the set of unvisited tertiary web page(s) is unvisited by the user;
determining tertiary relevance score(s) for each unvisited tertiary web page of the first set of unvisited tertiary web page(s), where each tertiary relevance score indicates an amount of relevance for its respective unvisited tertiary web page with respect to the first set of search term(s); and
presenting, to the user, an indication of the tertiary relevance score(s) for at least one of the unvisited tertiary web page(s) of the first set of unvisited tertiary web page(s).

17. The computer-implemented method of claim 13, wherein the first set of unvisited secondary web page(s) includes a plurality of unvisited secondary web pages, and wherein the computer-implemented method further comprises:
presenting, to the user, an indication of the relevance score for at least one additional unvisited secondary web page of the first set of unvisited secondary web page(s), wherein presenting the indication of the relevance score for the at least one additional unvisited secondary web page of the first set of unvisited secondary web page(s) includes automatically redirecting a web browser of the user to the respective additional unvisited secondary web page of the first set of unvisited secondary web page(s).

18. The computer-implemented method of claim 13, wherein the relevance score(s) for each unvisited secondary web page of the first set of unvisited secondary web page(s) are determined based, at least in part, on: (i) an amount of similarity between on-page text of the respective unvisited secondary web page(s) and the search terms; (ii) whether the respective unvisited secondary web page(s) were authored by known experts associated with the search terms; (iii) whether the respective unvisited secondary web page(s) are located at web domains that are known for content relating to the search terms; and (iv) whether the respective unvisited secondary web page(s) contain content confirmed as being accurate.

* * * * *